US012567258B2

(12) United States Patent
Broers et al.

(10) Patent No.: US 12,567,258 B2
(45) Date of Patent: Mar. 3, 2026

(54) SENSOR FUSION SCHEME FOR OCCUPANT DETECTION

(71) Applicant: SIGNIFY HOLDING B.V., Eindhoven (NL)

(72) Inventors: Harry Broers, 'S-Hertogenbosch (NL); Jan Ekkel, Oss (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/727,726

(22) PCT Filed: Dec. 19, 2022

(86) PCT No.: PCT/EP2022/086578
§ 371 (c)(1),
(2) Date: Jul. 10, 2024

(87) PCT Pub. No.: WO2023/134965
PCT Pub. Date: Jul. 20, 2023

(65) Prior Publication Data
US 2025/0069403 A1      Feb. 27, 2025

(30) Foreign Application Priority Data
Jan. 11, 2022      (EP) ..................................... 22150841

(51) Int. Cl.
*G06V 20/52* (2022.01)
*G01J 5/00* (2022.01)
(Continued)

(52) U.S. Cl.
CPC ............ *G06V 20/52* (2022.01); *G01J 5/0025* (2013.01); *G06T 7/70* (2017.01)

(58) Field of Classification Search
None
See application file for complete search history.

(56) References Cited

U.S. PATENT DOCUMENTS 6,246,321 B1 * 6/2001 Rechsteiner ..... G08B 13/19604
340/567

FOREIGN PATENT DOCUMENTS

CN      102567715 A  *  7/2012
CN      104095639 B  *  7/2016
(Continued)

OTHER PUBLICATIONS

Narayana, S., et al., "Loci: Privacy-Aware, Device-Free, Low-Power Localization of Multiple Persons Using IR Sensors," 19th ACM/IEEE International Conference on Information Processing in Sensor Networks (IPSN), 2020 (12 Pages).
(Continued)

*Primary Examiner* — Hung Q Dang

(57) ABSTRACT

The invention relates to an occupant or presence detection system and method where movement detection of an infrared (IR) sensor device and presence detection of an image sensor device are combined. Information derived from an IR movement detection signal is combined with object locations extracted by the image sensor device to distinguish human beings from static objects and improve occupant or presence detection in various applications, such as light control, desk occupancy and people counting in office applications that use advanced sensing bundles (ASB).

10 Claims, 6 Drawing Sheets

(51) Int. Cl.
  *G06F 18/25*            (2023.01)
  *G06T 7/70*             (2017.01)

(56)                    References Cited

FOREIGN PATENT DOCUMENTS

| | | | | | |
|---|---|---|---|---|---|
| CN | 209842639 | U | * | 12/2019 | |
| CN | 108332361 | B | * | 10/2020 | .............. F24F 11/61 |
| WO | WO-2006105094 | A2 | * | 10/2006 | ................ G01J 5/08 |
| WO | 2020260609 | A1 | | 12/2020 | |
| WO | 2021165408 | A1 | | 8/2021 | |

OTHER PUBLICATIONS

Yang, Bo, et al., "A Dual-Typed and Omnidirectional Infrared Perceptual Network for Indoor Human Tracking," IOP Publishing, Measurement Science and Technology, Meas. Sci. Technol. 32 (2021) 115124, https://doi.org/10.1088/1361-6501/ac1b0c, 2021 (12 Pages).
Alam, Fakhrul, et al., "Device-Free Localization: a Review of Non-RF Techniques for Unobtrusive Indoor Positioning," IEEE Internet of Things Journal, vol. 8, No. 6, Mar. 2021 (22 Pages).

* cited by examiner

| S1101 TPS → TO |
| S1102 PIRS → AS |
| S1103   ASC |
| S1104   FPT |

SENSOR FUSION SCHEME FOR OCCUPANT DETECTION

CROSS-REFERENCE TO PRIOR APPLICATIONS

This application is the U.S. National Phase application under 35 U.S.C. § 371 of International Application No. PCT/EP2022/086578, filed on Dec. 19, 2022, which claims the benefit of European Patent Application No. 22150841.9, filed on Jan. 11, 2022. These applications are hereby incorporated by reference herein.

FIELD OF THE INVENTION

The invention relates to the field of occupant or presence detection systems in various environments, such as—but not limited to—lighting systems, for use in various different applications for home, office, retail, hospitality and industry.

BACKGROUND OF THE INVENTION

Building automation systems are becoming more sophisticated and increasingly require an ability to sense motionless objects, multiple objects and direction of motion. These enhanced sensing capabilities can also support emerging object detection applications in industrial medical and retail settings. In lighting applications for example, lights may be switched on when the presence of a person is detected and may be switched off after a hold time. Desk occupancy and people counting metrics give building owners valuable information about room utilization.

Passive infrared (PIR) sensors do a good job at detecting the presence of warm bodies in a room, as long as those bodies are moving. However, these simple sensors won't detect motionless objects or directions of movement.

Moreover, the digital output signal of a PIR sensor is very inaccurate in correctly classifying motion levels. Similar movements at different distances can result in different motion levels. Different movements (e.g., arm sway and walking) at different distances can thus result in the same motion level. The large observation area of PIR sensors make it difficult to use motion detection for desk occupancy. When multiple desk locations are inside the observed area, the specific desk location with movement cannot be determined.

The large observation area of a PIR sensor, its dependency of motion type and motion location, make it difficult to decide if a motion trigger is within a specified observed range. This results in unpredictable detection behaviour and potentially unpredictable light control.

To get around the above sensing limitations of PIR sensors, a more sophisticated passive IR sensing technology known as a thermopile array has been developed. Instead of a single sensing element employed by conventional PIR motion detectors, the thermopile array consists of multiple infrared (IR) sensing elements working together. These coordinated sensing elements and integrated signal processing capabilities allow the thermopile array to measure absolute temperatures as well as temperature gradients. PIR motion detectors, by contrast, can only pick up changes in temperature within their field of view, which is why they can't reliably detect bodies at rest. The coordinated sensing elements of a thermopile array can do more than just read temperatures. They can also pick up the direction of movement (e.g., up, down, left, right and diagonally). Thermopile arrays can even detect multiple people or objects as they move in different directions. They can also sense an object's proximity to the detector and handle simple gesture control tasks.

Multi-pixel thermopile array sensors can thus be used to localize persons within the sensors field of view. Sophisticated algorithms can be configured to track persons based on a movement of their thermal footprint.

For presence detection with multi-pixel thermopile, there may be no challenge when persons are walking towards or leave their desk. In those cases, consecutive frames differ a lot. But when sitting behind a desk, a person may remain still for quite a while. Due to the low resolution and signal-to-noise ratio (SNR), conventional multi-pixel thermopile sensors cannot reliably detect minor motions by humans. This is worsened by partly occlusion of the moving body parts when the person is not near to the centre of a field of view of the sensor. Also, by relying on the thermopile data only, signal noise can lead to errors in classifying thermal objects as persons. Hence, algorithms may decrease the probability of a detected object to be a person and eventually switch off the lights while there is still a person present.

SUMMARY OF THE INVENTION

It is an object of the present invention to provide a presence or occupant detection scheme with improved detection reliability, especially in case of minor motions.

This object is related to the discussion herein, including regarding one or more of an apparatus, a luminaire, a lighting management system, a method, and a computer program product.

According to a first aspect, an apparatus is provided for classifying an object in an observation range, the apparatus comprising:

an electromagnetic image sensor for generating an image of at least a portion of the observation range;

a passive infrared (PIR) sensor for detecting an object movement and an object distance from the PIR sensor and for outputting output information; and a controller configured to analyze analogue signal characteristics of the output information of the PIR sensor to derive a motion type and a distance of the motion with respect to the passive infrared sensor; analyze the image to localize objects with a thermal distribution similar to a human being in the observation range; distinguish a human being from a non-human static object in the observation range by: determining the human being if the distance at which said motion is detected with respect to the passive infrared sensor matches with a detected location of a localized object; determining the non-human static object if the distance at which said motion is detected with respect to the passive infrared sensor does not match with a detected location of a localized object. According to a second aspect, a method of classifying an object in an observation range is provided, the method comprising:

generating an image of the observation range;

using a PIR sensor to detect an object movement and an object distance from the PIR sensor and for outputting output information; and analyzing analogue signal characteristics of the output information of the PIR sensor to derive a motion type and a distance of the motion with respect to the passive infrared sensor;

analyzing the image to localize objects with a thermal distribution similar to a human being in the observation range;

distinguishing between a human being and a non-human static object in the observation range by determining the human being if the distance at which said motion is detected with respect to the passive infrared sensor matches with a detected location of a localized object; determining the non-human static object if the distance at which said motion is detected with respect to the passive infrared sensor does not match with a detected location of a localized object.

Accordingly, movement detection of the passive infrared sensor and presence detection in an image obtained from an electromagnetic image sensor are combined to improve reliability of presence or occupant detection or tracking. Information derived from a movement detection signal of the passive infrared sensor is combined with object locations extracted from the image of the electromagnetic image sensor to distinguish human beings or other living objects (e.g., animals) from static objects and improve occupant or presence detection or tracking in various applications. Said living object may, in alternative objects of the present invention, be a dynamic object or moving object.

Hence, the PIR sensor according to the invention may output output information. The PIR sensor may output an analogue signal characteristic. Th PIR sensor may alternatively output signals indicative of the motion type and the distance of the motion with respect to the PIR. The controller may receive said motion type and said distance. The controller may also analyze the image to determine an object location, and distinguish a human being from a non-human static object in the observation range if the distance matches with a object location. Said distance of the motion may be phrased as the distance of a minor motion detected by the PIR with respect to the PIR.

According to a third aspect, a device is provided, which comprises the apparatus of the first aspect and a light source or a heating and/or cooling and/or ventilation source or a security element, wherein the controller is configured to control the light source or the heating and/or cooling and/or ventilation source or the security element based on the result of classification of the object.

According to a fourth aspect, a lighting or HVAC or security management system comprising a plurality of devices of the third aspect as is provided.

According to a fifth aspect, a computer program product is provided, which comprises code means for producing the steps of the above method of the second aspect when run on a controller.

According to an alternatively phrased aspect, an apparatus is provided for classifying an object in an observation range, the apparatus comprising:

an electromagnetic image sensor for generating an image of at least a portion of the observation range;

a passive infrared (PIR) sensor for detecting an object movement and an object distance from the PIR sensor; and a controller configured to distinguish a living object from a static object by correlating an output information of the PIR sensor with an object location extracted from the image.

According to a first option of any of the first to fifth aspects, the electromagnetic image sensor may comprise a two-dimensional thermal sensor array or radar sensor or optical sensor. Thereby, an improved occupant detection system can be provided for a variety of image sensing technologies.

According to a second option of any of the first to fifth aspects, which can be combined with the first option, the image sensor and the PIR sensor may be integrated in a sensor bundle that comprises a signal processing platform to process sensor information extracted from both the image sensor and the PIR sensor. Thus, a modular sensing device can be provided that could be used as an add-on for devices used in presence or occupant detection or tracking systems According to a third option of any of the first to fifth aspects, not claimed, which can be combined with the first or second option, a model may be used (e.g., by the controller) that describes analogue signal characteristics or motion levels of the output information of the PIR sensor depending on a motion type and distance towards the PIR sensor in an algorithm that combines the output information and the image. Thereby, analogue signal characteristics and/or motion levels detected by the PIR sensor can be combined with image information for better object classification.

According to a fourth option of any of the first to fifth aspects, not claimed, which can be combined with any one of the first to third options, analogue signal characteristics derived from the output information of the PIR sensor and a model describing the relation of the analogue signal characteristics, motion type and detection distances may be applied (e.g., by the controller) to filter presence triggers on object locations extracted from the image. This provides the advantage that the proposed combination of sensor outputs can be directly applied to mask potential presence triggers, so that only human beings trigger presence mechanisms (e.g., switching on the light at a working place).

According to a fifth option of any of the first to fifth aspects, as partly mentioned before, which can be combined with any one of the first to fourth options, analogue signal characteristics of the output information of the PIR sensor and/or digital motion levels may be analyzed (e.g., by the controller) with respect to a model to derive motion type and distance of the motion with respect to the PIR sensor, and the image may be analyzed (e.g., by the controller) to localize objects with thermal properties of a human being ("hot objects") in the observation range, and expected signal shapes may be matched (e.g., by the controller) with detected locations of the localized objects to distinguish between living objects and static hot objects. Thereby, analogue signal characteristics and/or motion levels detected by the PIR sensor can be combined with image information for better object classification.

According to a seventh option of any of the first to fifth aspects, not claimed, which can be combined with any one of the first to sixth options, the living object may be distinguished from the static object (e.g., by the controller) by applying a model with criteria including at least one of static objects do not trigger a PIR minor motion event, a distance of a moving object is estimated based on amplitude and frequency of raw PIR signals while the model is trained to give a prediction of a distance and speed of the moving object, and information including at least one of analogue PIR signal of sensor noise, analogue PIR signal shapes of static objects at certain locations, analogue PIR signal shapes of minor motions by static person at certain locations, and analogue PIR signal shapes of major motions by moving person at certain locations or walking certain trajectories. Thereby, the discrimination efficiency can be increased by proper training of the applied model.

According to an eighth option of any of the first to fifth aspects, not claimed, which can be combined with any one of the first to seventh options, a trained model may be used (e.g., by the controller) for estimating a location of a medium and/or major motion and to correlate this with a still and/or moving object in the image, wherein the model is trained with respect to a relation of actual motions and reported classified motion for specific locations. Thus, a location-dependent motion classification can be provided for better discrimination.

According to a ninth option of any of the first to fifth aspects, not claimed, which can be combined with any one of the first to eighth options, presence triggers may be filtered (e.g., by the controller) by estimating a correlation between an estimated location of a PIR event and an object in the image. Thereby, a detected PIR event can be associated with an objected extracted from the image of the image sensor.

According to a tenth option of any of the first to fifth aspects, which can be combined with any one of the first to ninth options, the device of the third aspect may be configured to be mounted to a ceiling or a wall of a building and may further comprise an integrated sensor module with the image sensor and the PIR sensor. Thereby, a downward observation of objects in buildings can be achieved for improved presence or occupant detection in building structures.

According to an eleventh option of any of the first to fifth aspects, which can be combined with any one of the first to tenth options, the lighting or HVAC or security management system of the fourth aspect may be configured to combine information received from the plurality of devices for monitoring desk occupancy and space utilization. Thus, a lighting or HVAC or security network can be adapted to provide a presence or occupant detection or tracking system with enhanced observation range.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the apparatus(es), the device(s), the lighting or HVAC or security management system(s), and the computer program product(s) provided herein may have similar and/or identical preferred embodiments, as deifned herein.

It shall be understood that a preferred embodiment of the invention can be any combination of the features element, embodiments, functionalities, etc. provided herein.

These and other aspects of the invention will be apparent from and elucidated with reference to the embodiments described hereinafter.

DETAILED DESCRIPTION OF EMBODIMENTS

Various embodiments of the present invention are now described based on a sensor-controlled lighting or illumination system for the office segment. Although the present invention is particularly advantageous within the context of illumination systems, the invention is not limited thereto and may also be used in other occupant or presence detection systems for other applications, such as heating, ventilation and air conditioning (HVAC) and security systems.

Throughout the following, a light source may be understood as a radiation source that generates visible or non-visible light (including e.g. infrared heating panels and ultraviolet light-based disinfection luminaires for air and/or surface disinfection). The light source may be included in a luminaire, such as a recessed or surface-mounted incandescent, fluorescent or other electric-discharge luminaires. Luminaires can also be of the non-traditional type, such as fiber optics with the light source at one location and the fiber core or "light pipe" at another.

Sensor modules can be integrated into connected luminaires in office ceilings for the office segment. So-called sensor bundles use several sensing modalities to monitor office space usage and environmental conditions.

According to various embodiments, a sensor fusion scheme is proposed to improve reliability of presence or occupant detection by combining electromagnetic image information (e.g., multi-pixel thermal image or radar image or optical image information) with additional distance information and/or motion characteristics provided by an IR sensor (e.g., a PIR sensor). The two-dimensional image information may be obtained from an image sensor (including a thermal image sensor, such as a thermopile sensor array, a microbolometer or other IR sensor array), a time-of-flight camera or other optical image sensor, a radar sensor, or another type of image sensor.

In an example, an image-based person tracking algorithm can be supported with additional distance information and motion characteristics obtained from a PIR sensor. The amplitude of the analogue PIR sensor signal is proportional to the distance from the person to the PIR sensor. Furthermore, the analogue signal characteristics of the PIR sensor for minor motions differ from those for major motions. A model can be constructed to predict PIR signal shape or motion levels based on distance and motion type.

Figure 1:
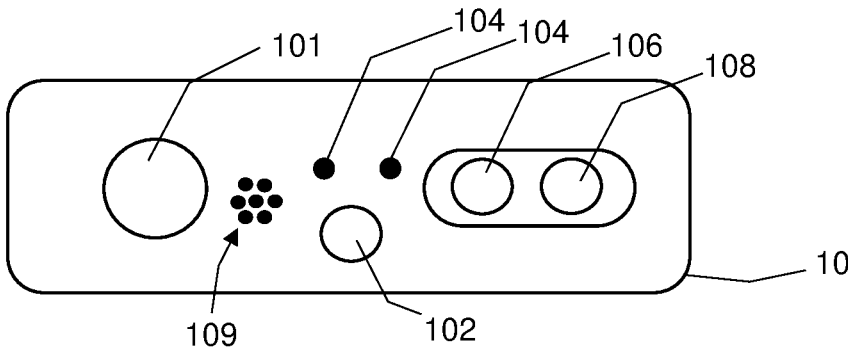
FIG. 1 shows schematically an advanced sensor bundle containing multiple sensor devices, according to various embodiments.

FIG. 1 shows schematically an example of an advanced sensor bundle 10 which may be (e.g., releasably) incorporated or mounted to a luminaire (not shown) of a lighting system and which comprises a two-dimensional (2D) multipixel thermopile sensor array 101 for presence detection, people counting and remote temperature (e.g., radiant) monitoring and a PIR sensor 102 for distance and motion sensing. Optionally, one or more of a sound pressure sensor (e.g., microphone) 109, a daylight sensor 106, a local-temperature sensor (not shown) to monitor the office temperature, a humidity sensor 108 to determine the relative humidity, and indicator LEDs 104 may be provided.

Figure 2:
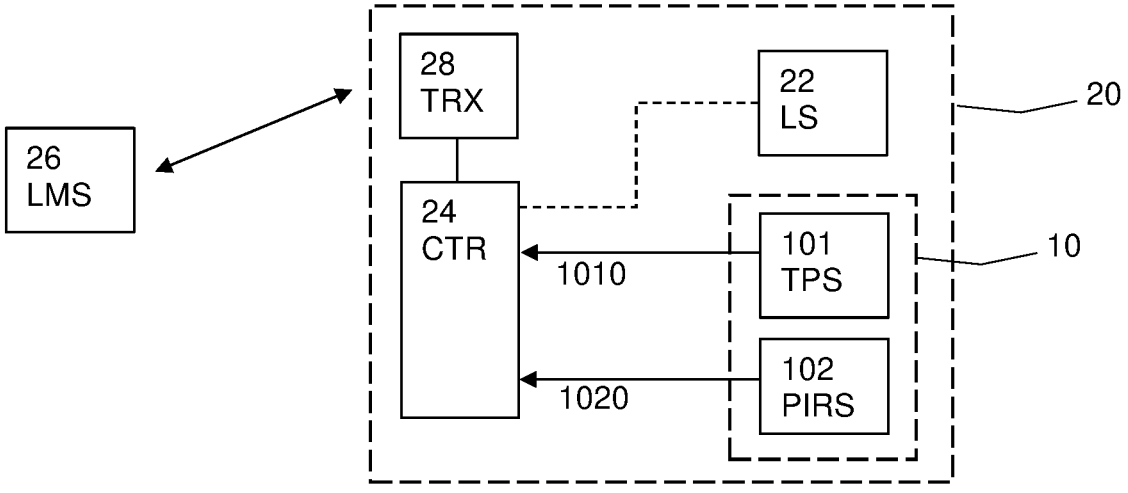
FIG. 2 shows schematically a luminaire device with combined PIR and thermopile sensors according to various embodiments.

FIG. 2 shows a location-aware (connected) luminaire 20 with a light source (LS) 22 of a lighting system and an integrated or associated sensor bundle 10 (e.g., as shown in FIG. 1) with the thermopile sensor array (TPS) 101 and the PIR sensor (PIRS) 102. The sensor bundle 10 or the lighting system may comprise a signal processing platform (e.g. microprocessor) to process sensor information extracted from both the PIR sensor 102 and the multi-pixel thermopile sensor array 101.

Furthermore, the luminaire 20 comprises a controller (CTR) 24 for controlling (e.g., switching on or off) the light source 22 in response to respective output information 1010, 1020 received from the thermopile sensor array 101 and the PIR sensor 102.

In an embodiment, the controller 24 may be configured to use a model that describes PIR analogue signal shapes or digital motion levels depending on the motion type and the distance towards the sensor in an algorithm that fuses the PIR output information 1020 and the multi-pixel thermopile output information 1010 for classification e.g. between static persons or animals (living objects) and static hot objects (laptop, screens, electrical devices).

Exemplary criteria applied by such a model may be that static objects in general do not trigger a PIR minor motion event and/or that a distance of a moving (living) object is estimated based on amplitude and frequency of raw PIR signals (e.g., the PIR sensor 102 may have multiple sensor cells) provided to the model, which can be trained (e.g., by supervised machine learning) to give a prediction of the distance and speed of the moving object. Additionally, the model for the PIR sensor 102 may contain information about at least one of analogue PIR signal of sensor noise, analogue PIR signal shapes of static objects at certain locations, analogue PIR signal shapes of minor motions by static person at certain locations, analogue PIR signal shapes of major motions by moving person at certain locations or walking certain trajectories.

Additionally, the controller 24 may be configured to analyze analogue PIR signal shapes and/or digital motion levels with respect to the model to derive motion type and distance of the motion with respect to the PIR sensor 102, and to analyze the multi-pixel thermopile image to localize hot objects in an observation range, and to match expected signal shapes with detected locations of hot objects to distinguish between persons and other hot objects.

Furthermore, the controller 24 may transmit and/or receive control signals via a transceiver (TRX) 28 to/from a lighting management system 26 of a lighting or illumination system or network in which the luminaire 20 is installed and commissioned. In an example, the controller 24 may communicate sensor responses and extracted locations to the lighting management system 26.

The transceiver 28 may be configured to exchange transmission signals according to a predetermined communication protocol, such as Bluetooth, Near Field Communication (NFC), WiFi (e.g., IEEE 802.11), Digital Addressable Lighting Interface (DALI), Zigbee, etc.

The lighting management system 26 may be configured to control luminaires (including the luminaire 20) of the lighting or illumination system or network for at least one of daylight-dependent illumination, movement/presence detection, energy and/or pollution saving, human centric lighting, and timer and/or calendar functions. In an example, the lighting management system 26 may combine information received from connected luminaires in the network to use this information for monitoring desk occupancy and space utilization.

There are several variants of the thermopile sensor array 101 available in different sizes and electronics packages, depending on the intended use. In an example, a plurality (e.g., 64) micro-electromechanical system (MEMS) thermopile elements may be arranged in a grid (e.g., an 8×8 grid) on a single detector chip. An integrated circuit for signal processing and a thermistor may be comprised in the array's onboard electronics. The entire thermopile sensor array 101 may be configured to fit within a reflow-compatible surface mount (SMD) package consisting of an RF-shielded metal cover, ceramic base and an integrated silicon lens through which the infrared energy passes. Furthermore, the thermopile sensor array 101 may offer a digital interface (e.g., an $I^2C$ interface or the like) for direct communication of temperature output values (i.e., temperature data) to the controller 24.

In operation, the thermopile sensor array 101 may first absorb emitted thermal energy across a predetermined field of view (60 degree). Each one of the array's sensing elements converts the thermal energy it absorbs to a proportional output signal. All temperature signals may then be amplified, converted from analog to digital and referenced against an ambient temperature value supplied by the thermistor. The sensor electronics may then forward the resulting temperature readings (i.e., temperature data) as output information 1010 to the controller 24 via the digital interface.

Moreover, a microprocessor (not shown) of the thermopile sensor array 101 may performs calculations that map temperatures from the individual thermopile elements into a complete thermal representation of the entire field of view. Changes in this representation over time may be used by the controller 24 to derive a direction of motion.

The thermopile sensor array 101 may work in both horizontal and vertical orientations with a maximum recommended detection distance (e.g., 5 m) and frame rates up to e.g. 10 fps and with a measurable temperature range of e.g. 0 to 80° C. (at an accuracy of ±2.5° C.) or e.g. −20 to 100° C. (at a reduced accuracy of ±3° C.).

Furthermore, the PIR sensor 102 may be configured to sense motion and can be used to detect whether a human has moved in or out of the sensors range. It is often referred to as "Passive Infrared", "Pyroelectric", or "IR motion" sensor. It may comprise a pyroelectric sensor (e.g., a round metal can with a rectangular crystal in the center) configured to detect levels of infrared radiation. Every object emits some low-level IR radiation, and the hotter the object is, the more IR radiation is emitted. When configured as a motion detector, the PIR sensor 102 may be split in two detection areas (e.g., halves or slots). The reason for that is that motion (i.e., a change if an IR level) is to be measured, not average IR levels. The detection areas may be connected so that they cancel each other out. If one detection area detects more or less IR radiation than the other detection area, the output may change to high (er) level or a low (er) level.

The detection areas of the PIR sensor 102 may comprise a special material that is sensitive to IR radiation and a fresnel lens where each of a plurality of lens facet may image a group of e.g. four rectangles (in case of a PIR sensor with four elements). The imaged areas may be different for different locations. Therefore, the signal for similar motions will be unique for each location. When the PIR sensor 102 is idle, both slots detect the same amount of IR radiation, the ambient radiation amount radiated from the room or walls or outdoors. When a warm body like a human or animal passes by, it first intercepts one detection area of the PIR sensor, which causes a positive differential change between the two detection areas. When the warm body leaves the sensing area, the reverse happens, whereby the sensor generates a negative differential change. These change pulses may be the output information 1020 to be detected and processed by the controller 24.

The PIR sensor 102 may itself be housed in a hermetically sealed metal can to improve noise/temperature/humidity immunity. There may be a window made of IR-transmissive material (e.g., coated silicon) that protects the sensing element. Behind the window the two balanced detection areas may be located.

Figure 3:
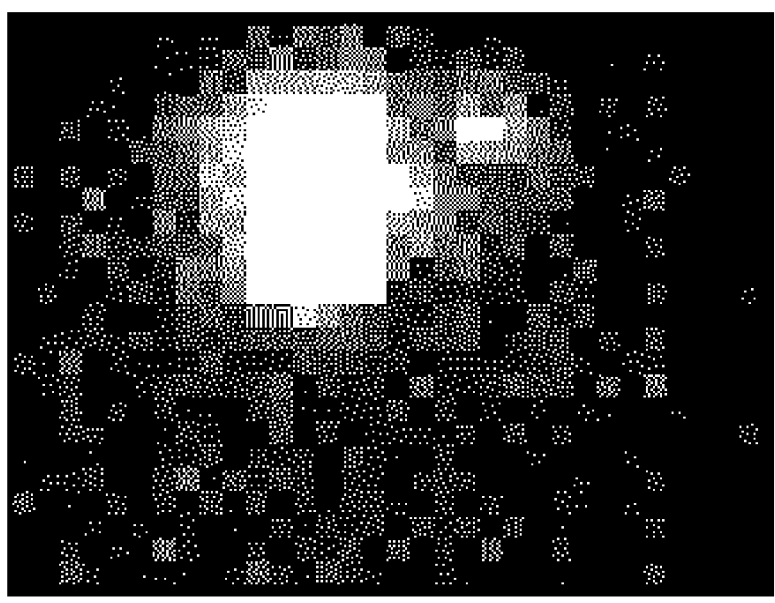
FIG. 3 shows schematically an example of a multi-pixel thermopile image.

FIG. 3 shows an example of a multi-pixel thermopile image obtained from the thermopile sensor array 101 with a person and a smaller hot object. The luminaire 20 of FIG. 2 may be mounted at the ceiling of an office building so that the thermopile sensor area 101 faces downwards. The thermal image of FIG. 3 is a low-resolution thermal image with 32×24 pixels.

An option to detect minor motions in a thermopile image is to keep a long-term average of the images (i.e., a background model) and calculate the difference for each new image frame.

Figure 4:
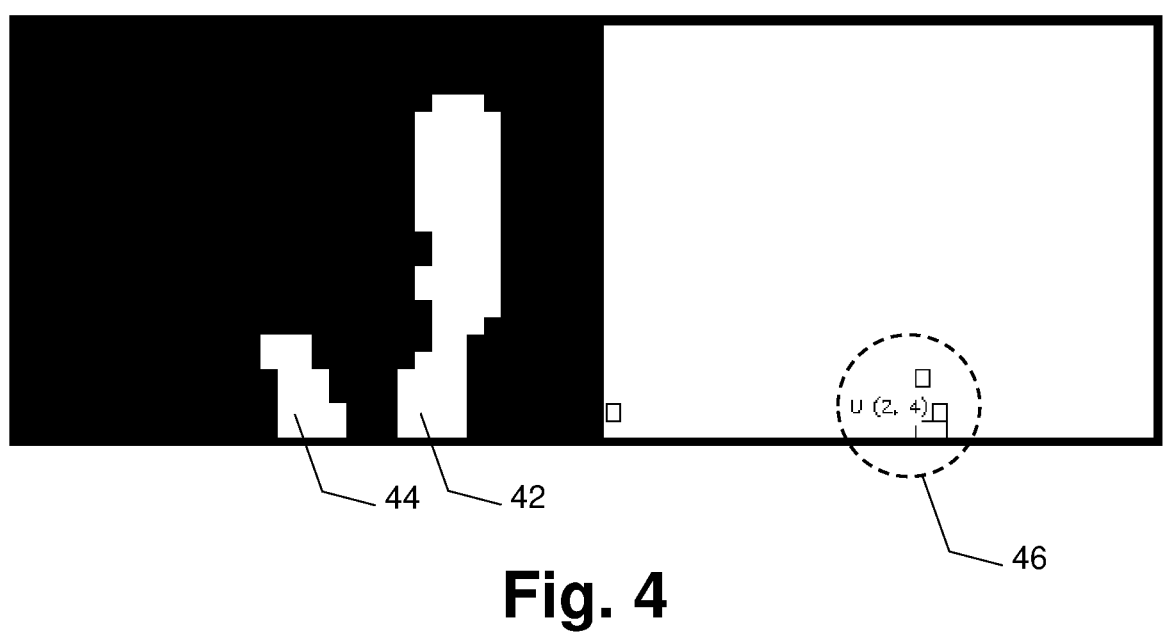
FIG. 4 shows schematically an example of a momentary thermopile image and a related motion image.

FIG. 4 shows schematically an example of a momentary thermopile image (left image) with a hot object (e.g., a radiator) 42 and a person 44, and a motion image (right image) created based on a background model.

The motion image (right image) can be detected as a difference between the current image frame (left image) and the background model, above a predetermined detection threshold. In the example of FIG. 4, the motion image indicates an area 46 which comprises moving pixels with a difference above the detection threshold. The parameter U(2, 4) indicates that 4 moving pixels in two separate areas have been detected.

However, due to low spatial resolution, low SNR, and/or occlusion effects, such a motion detection based on a thermopile image may be unreliable and insensitive. Therefore, it is proposed to upgrade the image information of the thermopile sensor array 101 with additional image information of the PIR sensor 102 to improve detection of minor motions.

While the low SNR and resolution of the multi-pixel thermopile sensor array 101 makes it hard or even impossible to detect minor motions, the PIR sensor 102 is very sensitive for minor motions.

Figure 5:
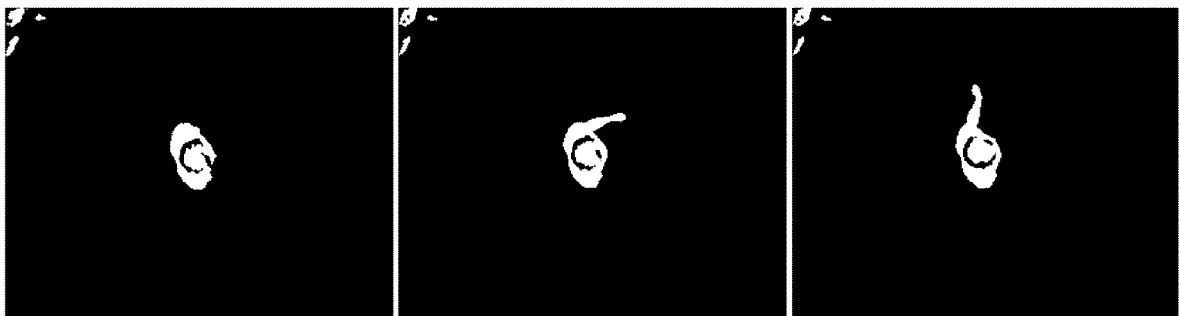
FIG. 5 shows schematically high-resolution thermal images based on PIR sensor data of a motion test.

FIG. 5 shows schematically high-resolution thermal images based on PIR sensor data of a motion test.

The thermal images of FIG. 5 have been recorded with a microbolometer-type of PIR sensor, which is an uncooled thermal sensor. It consists of an array of pixels, each pixel being made up of several layers. In an example, the bottom layer may consist of a silicon substrate and a readout integrated circuit (ROIC). Electrical contacts may be deposited and then selectively etched away. A reflector, for example, a titanium mirror, may be created beneath an IR absorbing material (detection area). Since some light is able to pass through the absorbing layer, the reflector redirects this light back up to ensure the greatest possible absorption, hence allowing a stronger signal to be produced. Next, a sacrificial layer may be deposited so that later in the process a gap can be created to thermally isolate the IR absorbing material from the ROIC. A layer of absorbing material may then be deposited and selectively etched so that the final contacts can be created. To create a final bridge like structure, the sacrificial layer may be removed so that the absorbing material is suspended (e.g. approximately 2 μm) above the readout circuit. After the array of pixels is created the microbolometer may be encapsulated under a vacuum to increase the longevity of the PIR sensor.

In the thermal images of FIG. 5, a person is standing below the PIR sensor 102 which detects major motion events of an arm sway in both horizontal and vertical plane. When the person location is changed to 1 m distance, the arm sway in the horizontal plane is mostly reported by the PIR as minor motion. At 2 m distance, the motion events are sparsely reported with minor motions as majority.

Figure 6:
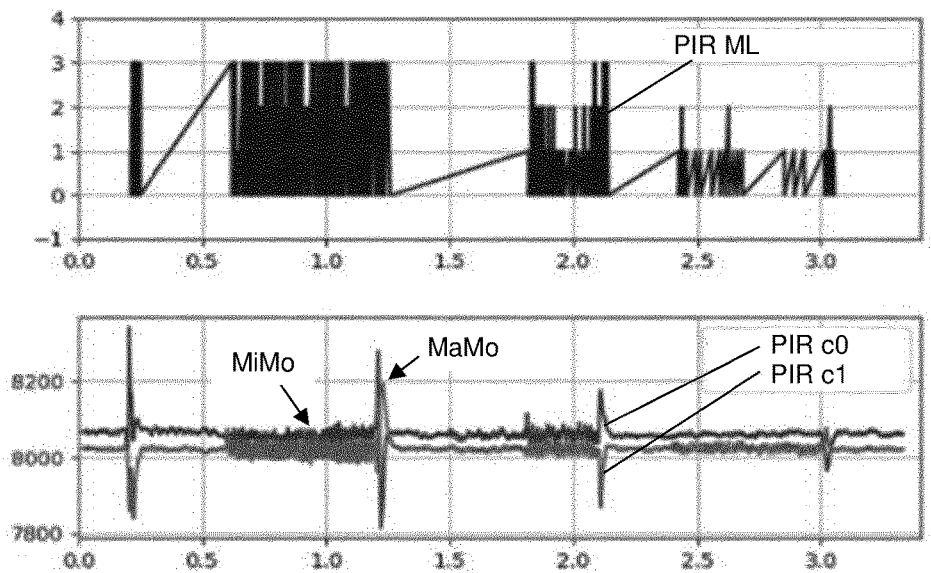
FIG. 6 shows schematically waveform diagrams of a of a PIR motion level and PIR motion signals.

FIG. 6 shows schematically waveform diagrams of a PIR motion level (top graph) and PIR motion signals (lower graph) over distance in the detection area.

More specifically, PIR sensor data are shown for a minor motion test (similar to FIG. 5) where a person makes continuous arm movements below the sensor mounted at the ceiling.

The top graph in FIG. 6 shows the discrete motion levels (PIR ML) of the PIR sensor 102 as an output of the signal processing of the sensor bundle 10, wherein level "0" indicates that no motion has been detected, level "1" indicates that a minor motion has been detected, level "2" indicates that a medium motion has been detected, and level "3" indicates that a major motion has been detected.

Additionally, the lower graph shows raw output motion signals PIR c0 and PIR c1 of the PIR sensor 102. It is clearly visible that both minor motions (MiMo) and major motions (MaMo) have a specific signal shape, and that the amplitude of the shape depends on the distance towards the sensor (i.e., the center of the detection range). The major motions (MaMo) are detected due to the person walking to the test location at distances close to 0 m, 1 m and 2 m.

Thus, by classifying PIR motion events as major, medium and minor motions and their distance to the center of the sensor detection range (field of view) the thermopile data can be enhanced.

Figure 7:
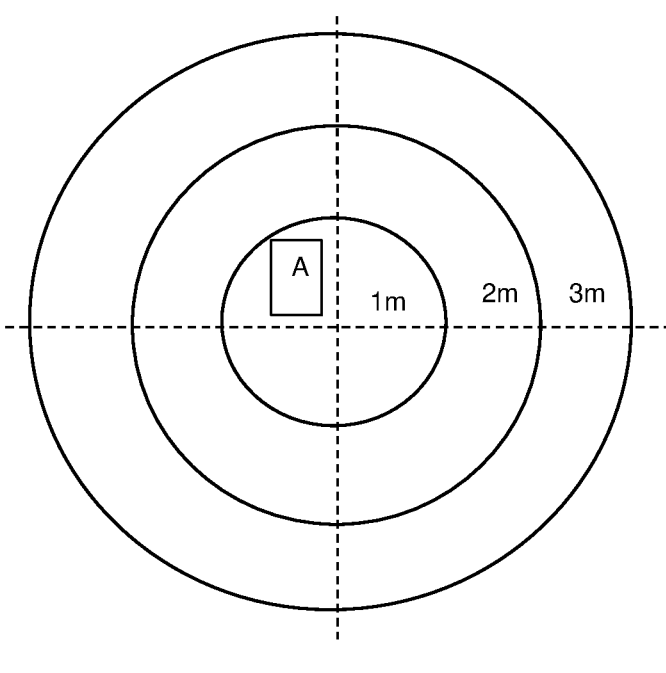
FIG. 7 shows schematically a two-dimensional diagram of a sensor detection range with distance ranges and a single thermal object.

FIG. 7 shows schematically a two-dimensional diagram of a sensor detection range with distance ranges 1 m, 2 m and 3 m and a single thermal object A.

In the example of FIG. 7, the single thermal object A is detected at a distance of 1 m from the center of the detection range of the thermopile sensor array 101 and the PIR sensor 102 and a minor motion is detected by the PIR sensor 102 at a distance of 1 m. Thus, there is a high probability that the thermal object is a person. Likewise, the absence of a minor motion over a certain period of time can be used to classify the object as non-human object.

Figure 8:
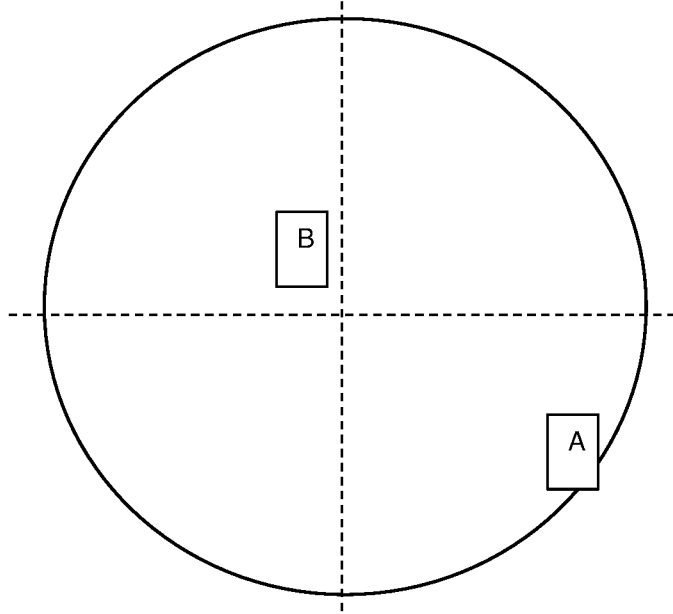
FIG. 8 shows schematically a two-dimensional diagram of a sensor detection range with two thermal objects at different distances.

FIG. 8 shows schematically a two-dimensional diagram of a sensor detection range with two thermal objects at different distances.

In FIG. 8, two thermal objects are detected, wherein a first thermal object A is detected at a distance of 3 m and a second thermal object B is detected at a distance of 1 m from the center of the thermopile sensors' detection range. Again, the minor motion signal strength can help to distinguish persons from hot objects. For example, when a minor motion is only detected at a distance of 3 m, the probability that the first object A is a human being is high, while it is low for the second object B.

Like minor motion PIR events, the medium and major events can be used to classify thermal objects when no motion is detected by the thermopile algorithm. For medium and major motions, the same may apply as for a minor motion. A trained model (e.g., a supervised machine learning model) may estimate a location of the medium and/or major motion and correlate this with a still and/or moving object in the thermal image. If no correlation is found, the living object may be out of the thermal sensor's field-of-view. The relation of actual motions and reported classified motion can be trained for specific locations e.g. to prevent that a minor motion of a close object is misclassified as a medium or major motion and/or that a major motion created by a distant object is misclassified as a medium or minor motion.

Hence, according to the invention, referring to FIGS. 7 and 8, the electromagnetic image sensor generates an image of at least a portion of the observation range. The passive infrared (PIR) sensor detects an object movement and an object distance from the PIR sensor. The PIR outputs output information. The output information may comprise said object movement and said object distance. The controller analyzes an analogue signal characteristic of the output information of the PIR sensor to derive a motion type and a distance of the motion with respect to the passive infrared sensor. For example, a motion type at object A or object B, and determine the corresponding distance from the PIR to the objects A or B with respect to the PIR, e.g. respectively 3 meter and 1 meter in FIG. 8. The controller further analyze the image to localize objects with a thermal distribution similar to a human being in the observation range. These may be the locations of objects A and B. The controller is then configured to distinguish a human being from a non-human static object in the observation range by: determining the human being if the distance at which said motion is detected with respect to the passive infrared sensor matches with a detected location of a localized object; determining the non-human static object if the distance at which said motion is detected with respect to the passive infrared sensor does not match with a detected location of a localized object. For example, when a minor motion is only detected at a distance of 3 m, the probability that the first object A is a human being is high, while it is low for the second object B.

Figure 9:
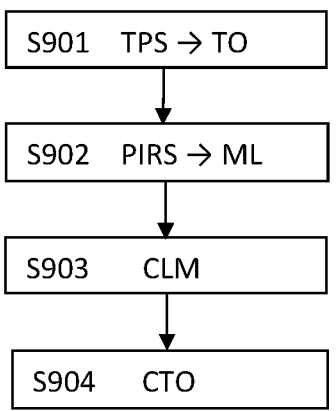
FIG. 9 shows a flow diagram of a person classification procedure based on object locations measured by multi-pixel thermopile data and PIR motion levels according to an embodiment.

FIG. 9 shows a flow diagram of a person classification procedure based on object locations measured by multi-pixel thermopile data and PIR motion levels according to an embodiment.

This procedure is related to a luminaire with an embedded or associated multipixel thermopile sensor array and an embedded or associated PIR sensor and may be executed by the controller 24 of FIG. 2.

In step S901, a thermal object (TO) detected by the thermopile sensor array (TPS) is derived from the output information received from the thermopile sensor array.

Then, in step S902, motion levels (ML) provided by the PIR sensor (PIRS) are derived from the output information received from the PIR sensor.

In subsequent step S903, a classification model (CLM) describing the relation of PIR motion level, motion type and detection distances is applied to classify the thermal objects monitored by the multi-pixel thermopile sensor array into static persons and static hot objects (i.e., objects with a temperature distribution similar to a human being or animal).

It is noted that distance information can be retrieved when analog PIR signals are input to the model. The distance information may help to classify when multiple thermal objects are detected. In case a single thermal object needs to be classified, the probability of the object being a living object increases if a PIR motion is detected. Finally, in step S904, the classified thermal object (CTO) is output e.g. for use by the lighting management system or for controlling a related luminaire.

Figure 10:
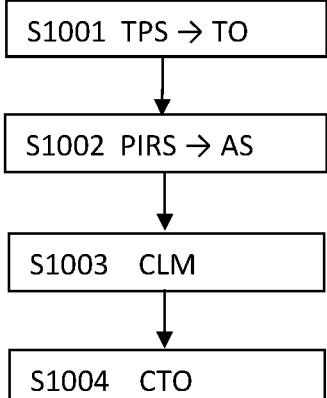
FIG. 10 shows a flow diagram of a person classification procedure based on object locations measured by multi-pixel thermopile data and PIR analogue signal characteristics according to an embodiment.

FIG. 10 shows a flow diagram of a person classification procedure based on object locations measured by multi-pixel thermopile data and PIR analogue signal characteristics according to another embodiment.

Again, this procedure is related to a luminaire with an embedded or associated multipixel thermopile sensor array and an embedded or associated PIR sensor and may be executed by the controller 24 of FIG. 2.

In step S1001, a thermal object (TO) detected by the thermopile sensor array (TPS) is derived from the output information received from the thermopile sensor array.

Then, in step S1002, analogue signal characteristics (AS) provided by the PIR sensor (PIRS) are derived from the output information received from the PIR sensor, as shown e.g. by the two channels in the bottom diagram of FIG. 6. These analogue signal characteristics may include at least one of signal amplitude, energy, range, frequency, periodicity, duration and dynamic properties over time, signal shape, and spectrogram.

In subsequent step S1003, a classification model (CLM) describing the relation of analogue signal characteristics, motion type and detection distances is applied to classify the thermal objects monitored by the multi-pixel thermopile sensor array into static persons and static hot objects.

Finally, in step S1004, the classified thermal object (CTO) is output e.g. for use by the lighting management system or for controlling a related luminaire.

Figure 11:
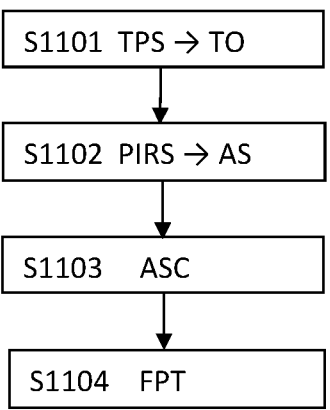
FIG. 11 shows a flow diagram of a procedure for filtering PIR presence triggers based on a multi-pixel thermopile observation range according to an embodiment.

FIG. 11 shows a flow diagram of a procedure for filtering PIR presence triggers based on a multi-pixel thermopile observation range according to an embodiment.

Again, this procedure is related to a luminaire with an embedded or associated multipixel thermopile sensor array and an embedded or associated PIR sensor and may be executed by the controller 24 of FIG. 2.

In step S1101, a thermal object (TO) detected by the thermopile sensor array (TPS) is derived from the output information received from the thermopile sensor array.

Then, in step S1102, analogue signal characteristics (AS) provided by the PIR sensor (PIRS) are derived from the output information received from the PIR sensor.

In subsequent step S1103, the derived analogue signal characteristics provided by the PIR sensor and a model describing the relation of the analogue signal characteristics, motion type and detection distances are applied to filter PIR presence triggers (FPT) on the thermal object locations monitored by the multi-pixel thermopile sensor array, e.g., by a masking process that masks thermal objects detected by the thermopile sensor array.

An example of such a filtering can be to ignore PIR motion events when no moving object is detected by the thermopile sensor array. This prevents false triggers caused by hot air from e.g. heaters or draft. This may be restricted to major motion only, major and medium, or all motion events.

In another example, a correlation between an estimated location of the PIR event and an object in the thermal image is estimated. If no such correlation is determined, the PIR event is ignored.

Finally, in step S1104, the filtered presence triggers are output e.g. for use by the lighting management system or for controlling a related luminaire.

To summarize, an occupant or presence detection system and method have been described, where movement detection of an IR sensor device and presence detection of an image sensor device are combined. Information derived from an IR movement detection signal is combined with object locations extracted by the image sensor device to distinguish human beings or other living objects from static objects and improve occupant or presence detection in various applications, such as light control, desk occupancy and people counting in office applications that use sensing bundles.

While the invention has been illustrated and described in detail in the drawings and foregoing description, such illustration and description are to be considered illustrative or exemplary and not restrictive. The invention is not limited to the disclosed embodiments. It can be applied to various applications in the field of interactive office systems or other propositions for connected office systems. More general, the proposed combined use of an IR sensor and a thermopile sensor (sensor fusion scheme) can be applied to other types of system where presence, occupant and/or motion detection are applied.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

The described procedures like those indicated in FIGS. 9 to 11 can be implemented as program code means of a computer program and/or as dedicated hardware of the receiver devices or transceiver devices, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus for classifying an object in an observation range, the apparatus comprising:
an electromagnetic image sensor for generating an image of at least a portion of the observation range;
a passive infrared, PIR, sensor for detecting an object movement and an object distance from the passive infrared sensor and for outputting output information; and
a controller configured to:
analyze analogue signal characteristics of the output information of the PIR sensor to derive a motion type and a distance of the motion with respect to the center of a detection range of the passive infrared sensor;

analyze the image to localize objects with a thermal distribution similar to a human being in the observation range;
distinguish a human being from a non-human static object in the observation range by:
determining the human being if the distance at which said motion is detected with respect to the passive infrared sensor matches with a detected location of a localized object; and
determining the non-human static object if the distance at which said motion is detected with respect to the passive infrared sensor does not match with a detected location of a localized object;
wherein the electromagnetic image sensor comprises a two-dimensional thermal sensor.

2. The apparatus of claim 1, wherein the electromagnetic image sensor is a thermopile sensor.

3. The apparatus of claim 1, wherein the image sensor and the PIR sensor are integrated in a sensor bundle that comprises a signal processing platform to process sensor information extracted from both the image sensor and the passive infrared sensor.

4. The apparatus of claim 1, wherein the motion type comprises a minor motion detected by the passive infrared, PIR, sensor.

5. The device of claim 4, configured to be mounted to a ceiling or wall of a building and further comprising an integrated sensor module with the electromagnetic image sensor and the passive infrared sensor.

6. The lighting system of claim 5, configured to combine information received from the plurality of devices for monitoring desk occupancy and space utilization.

7. A lighting system comprising a plurality of devices as claimed in claim 4.

8. A device comprising the apparatus of claim 1 and a light source, wherein the controller is configured to control the light source based on the result of classification of the object.

9. A method of classifying an object in an observation range, the method comprising:
generating an image of the observation range;
using a passive infrared sensor to detect an object movement and an object distance from the passive infrared sensor and to output output information; and
analyzing analogue signal characteristics of the output information of the PIR sensor to derive a motion type and a distance of the motion with respect to the passive infrared sensor;
analyzing the image to localize objects with a thermal distribution similar to a human being in the observation range; and
distinguishing between a human being and a non-human static object in the observation range by:
determining the human being if the distance at which said motion is detected with respect to the center of the detection range of the passive infrared sensor matches with a detected location of a localized object; and
determining the non-human static object if the distance at which said motion is detected with respect to the passive infrared sensor does not match with a detected location of a localized object.

10. A non-transitory computer readable medium comprising computer executable instructions that, when executed, perform at least the method of claim 9 when run on at least one processor.

* * * * *